United States Patent [19]

Kozyra et al.

[11] Patent Number: 5,120,150

[45] Date of Patent: Jun. 9, 1992

[54] STAMPED STEERING KNUCKLE FOR MOUNTING SUSPENSION COMPONENTS

[75] Inventors: William L. Kozyra, Rochester Hills; Ronald M. Revyn, Roseville; Vincent J. Santoro, East Detroit, all of Mich.

[73] Assignee: The Budd Company, Troy, Mich.

[21] Appl. No.: 579,369

[22] Filed: Sep. 7, 1990

[51] Int. Cl.$^5$ .............................................. F16B 2/02
[52] U.S. Cl. ....................................... 403/24; 403/290; 403/297; 403/344
[58] Field of Search ................ 403/24, 238 ∝ 240, 403/290, 297, 312, 344, 399; 280/93, 96.1

[56] References Cited

U.S. PATENT DOCUMENTS

| | | | |
|---|---|---|---|
| 752,808 | 2/1904 | Stewart | 403/239 |
| 1,240,708 | 9/1917 | Haeseler | 403/344 |
| 1,613,768 | 1/1927 | Perrot . | |
| 2,122,868 | 7/1938 | Morgan | 403/290 |
| 2,435,814 | 2/1948 | Allison . | |
| 2,771,301 | 11/1956 | Booth et al. . | |
| 3,034,810 | 5/1962 | Primeau . | |
| 3,039,787 | 6/1962 | Meyer . | |
| 3,101,961 | 8/1963 | White . | |
| 3,144,259 | 8/1964 | De Haan . | |
| 3,356,396 | 12/1967 | Drown | 403/290 |
| 3,472,331 | 10/1969 | Baker et al. . | |
| 3,758,129 | 9/1973 | Ishikawa et al. . | |
| 3,865,394 | 2/1975 | Epner et al. . | |
| 3,940,159 | 2/1976 | Pringle . | |
| 4,037,680 | 7/1977 | Grove . | |
| 4,046,212 | 9/1977 | Hansen . | |
| 4,057,120 | 11/1977 | Roethlisberger . | |
| 4,089,383 | 5/1978 | Blood et al. . | |
| 4,195,862 | 4/1980 | Specktor et al. . | |
| 4,200,165 | 4/1980 | Bowman, Jr. et al. . | |
| 4,271,922 | 6/1981 | Kishline . | |
| 4,282,949 | 8/1981 | Kopich et al. . | |
| 4,377,298 | 3/1983 | Finn et al. . | |
| 4,507,105 | 3/1985 | Stottmann et al. | 403/344 X |
| 4,618,159 | 10/1986 | Kozyra et al. . | |
| 4,671,478 | 6/1987 | Schoenig et al. | 403/297 X |
| 4,722,540 | 2/1988 | Kozyra et al. . | |
| 4,877,050 | 10/1989 | Harris | 403/290 X |
| 4,887,927 | 12/1989 | Bond | 403/399 X |
| 4,984,930 | 1/1991 | Connor | 403/290 |

FOREIGN PATENT DOCUMENTS

| | | |
|---|---|---|
| 713933 | 11/1941 | Fed. Rep. of Germany . |
| 829419 | 3/1938 | France . |
| 2043199A | 10/1980 | United Kingdom . |
| 2132580A | 7/1984 | United Kingdom . |
| 2140075A | 11/1984 | United Kingdom . |

Primary Examiner—Randolph A. Reese
Assistant Examiner—Heather Chun
Attorney, Agent, or Firm—Harness, Dickey & Pierce

[57] ABSTRACT

A steering knuckle attachment configuration for mounting with motor vehicle suspension and steering components is provided in a one piece steering knuckle housing. The lower end of the housing includes a flat major face to which a bearing carrier or torque plate may be mounted. The knuckle housing has both an upper end and a lower end, one of which includes an integrally formed open ended channel that is also open on one side. The channel is adapted to receive in its open end an attachment post projecting a suspension component. The post is secured within the channel by a transversely inserted fastener which engages the post member in an interference relationship.

5 Claims, 2 Drawing Sheets

STAMPED STEERING KNUCKLE FOR MOUNTING SUSPENSION COMPONENTS

BACKGROUND AND SUMMARY OF THE INVENTION

The invention relates generally to a motor vehicle suspension. More particularly, the invention relates to concepts for attaching suspension components to a stamped steering knuckle.

In many motor vehicles, the steering knuckle is constructed as a one piece forged or cast unit. Such units typically include structures for the mounting a wheel bearing, control arms, steering link and various other suspension components.

Although previous steering knuckles have generally performed satisfactorily, there is a continuing desire to produce such products having enhanced structural characteristics while also reducing weight and cost. Weight reductions provide numerous advantages, including reducing the total vehicle weight and the suspension unsprung mass. With today's emphasis on higher efficiency cars, any reduction in vehicle weight is an advancement in terms of fuel efficiency. Additionally, reductions in the weight of steering knuckles decreases the vehicle's unsprung mass and thereby enhance performance, both in terms of vehicle ride and vehicle handling.

It is therefore an object of the present invention to provide a one piece, stamped steering knuckle housing.

It is a further object of the present invention to provide a steering knuckle assembly having a reduced overall weight.

Another object of the present invention is to produce a steering knuckle assembly having an improved means for the attachment of suspension and steering components.

The present invention provides for a steering knuckle assembly which includes a one piece stamped steering knuckle housing. The housing is stamped and eliminates welding requirements for securing mounting brackets to the assembly. The various embodiments of the present invention for attaching suspension and steering components to a knuckle housing generally include an open section or channel, formed by the knuckle housing, with a suspension or steering link post inserted therein and held in position by one or more transverse retaining members such as bolts. Various suspension components can be attached to the steering knuckle of the present invention and include upper and lower control arms, steering links, struts, and additional components such as a wheel bearing and a wheel bearing carrier or torque plate. The knuckle housing in the present invention also exhibits a flat face which forms a mounting surface for the wheel bearing carrier, which in turn supports a disc brake assembly.

The steering knuckle attachment concepts of the present invention eliminate the necessity of welding additional brackets to the knuckle housing.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE DRAWINGS

Figure 1:
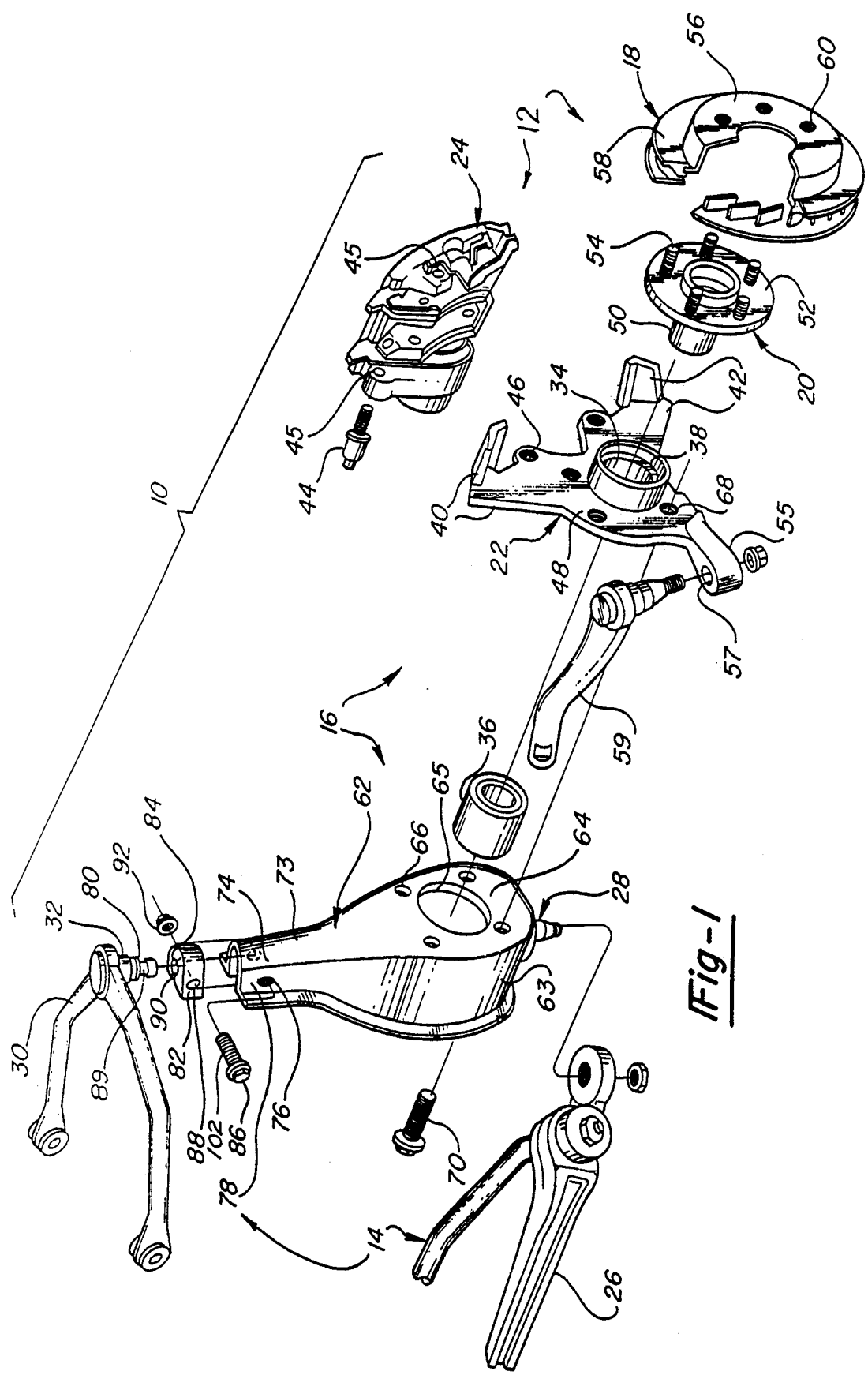
FIG. 1 is an exploded perspective view of a steering knuckle assembly embodying the principles of the present invention and showing associated components in unassembled positions.

Now with reference to the drawing, in FIG. 1 a vehicle front end assembly is illustrated in an unassembled position and generally designated as 10. The primary components of the front end assembly 10 are a brake assembly 12, suspension components 14 and a steering knuckle assembly 16.

The steering knuckle assembly 16 of the present invention is designed to support a disc brake caliper assembly 24, a rotor 18, a rotational hub 20, and a wheel bearing 36. The steering knuckle assembly 16 is further configured to provide mounting positions for various suspension components 14. The embodiment of FIG. 1 is shown as being adapted for attachment to a lower control arm 26 and an upper control arm 30 at their respective ball joints 28 and 32. The steering knuckle assembly 16 itself primarily includes a knuckle housing 62 and a torque plate or bearing carrier 22.

The bearing carrier 22 may be constructed as a cast or forged metal part and includes an axially elongated internal bore 34 which is of a size to accept a cartridge-type wheel bearing 36. The diameter of the bore 34 is preferably chosen to provide a interference or press fit engagement between the bore 34 and the wheel bearing 36. The snugness of press fit provides for an accurate bearing alignment within the bore 34 and further prevents the wheel bearing 36 from rattling. At its outboard end the bore 34 terminates in a radially inward ridge or shoulder 38. The shoulder 38 has a diameter significantly less than the outermost diameter of the wheel bearing 36. In this manner, the shoulder 38 acts as an abutment to axially retain the wheel bearing 36 in the bearing carrier 22. Integrally formed with the inboard end of the bore 34 is a radially outward extending flange 48.

The flange 48 of the bearing carrier 22 further includes a pair of radially extending and angularly offset torque arms 40 and 42 for supporting the disc brake caliper assembly 24. The disc brake caliper assembly 24 may be secured to the torque arms 40 and 42 by threaded fasteners 44 inserted through openings 45 in the caliper assembly 24 and mounting bores 46 in the torque arms 40 and 42. By providing reaction points, the torque arms 40 and 42 enable the caliper assembly 24 to exert a frictional retarding force on the disc brake rotor 18. A mounting arm 55 radially extends from the flange 48 of the bearing carrier 22 and provides an attachment point or seat 57 for a steering link 59 whose manipulation will control the steering of the vehicle.

The hub 20 is constructed as a cylindrical extension 50 and has an exterior surface which frictionally engages the inner surface of the wheel bearing 36. Radially extending from the outboard end of the cylindrical extension 50 is a mounting flange 52 which includes five wheel mounting studs 54 axially oriented and equidistantly spaced about the cylindrical extension 50. The rotor 18 may be constructed as an integral unit or, in the alternative, as a composite unit having a stamped sheet metal center 56 and a cast outer rotor surface 58. The rotor 18 is mounted to the hub 20 by the insertion of the wheel mounting studs 54 through correspondingly aligned bores 60 in the center 56 of the rotor 18.

The steering knuckle assembly 16 itself includes a knuckle housing 62 which is formed by stamping a sheet of mild steel. The knuckle housing 62 is formed by deep draw stamping. Mild steel is preferable for use with deep draw stamping as it allows the knuckle housing 62 to be stamped into a preferred wall thickness of approximately five to six millimeters. Deep draw stamping is further desirable in that it allows the present invention to be integrally formed with the knuckle housing 62, thus eliminating the necessity of welding mounting brackets to the knuckle housing 62 and adding weight.

Formed in a lower end 63 of the knuckle housing 62 is a flat face 64. The face 64 provides a surface for engagement with the radially extending flange 48 of the bearing carrier 22. An aperture 65, having a diameter less than that of the wheel bearing 36, is also formed in the flat face 64 and acts as an inboard abutment for completing the securement of the wheel bearing 36 in the steering knuckle assembly 16. If the steering knuckle housing 62 is to be incorporated in a front wheel drive vehicle, the aperture 65 will provide access for a drive axle (not shown) which would engage the hub 20.

The angular relationship between the knuckle housing 62 and the bearing carrier 22 is critical to the proper operation of the vehicle. Correct alignment is assured by the provision of correspondingly spaced bores 66 and 68, respectively provided on the face 64 and the carrier flange 48, which become aligned only when the desired angular relationship is achieved. Once properly aligned, the bearing carrier 22 is secured to the flat face 64 by threaded fastener 70 inserted through the bores 66 and 68.

As previously suggested, suspension components 14 are typically mounted to the opposing ends 63 and 73 of the knuckle housing 62. Three embodiments of the improved means for attachment are shown in the drawings and, where appropriate, like elements are designated with like numerals.

Integrally formed in the upper end 73 of the knuckle housing 62 is a mounting bracket or channel 74. In a preferred embodiment, the channel 74 includes a semicircular closed bend which terminates in a pair substantially parallel arms 78. While FIG. 1 illustrates the channel 74 as being semicircularly shaped, various other channel shapes may also be readily employed. The channel 74 exhibits openings in generally two directions. The first opening runs longitudinally with the channel 74 and allows the channel 74 to be stamped in to shape. This first opening is referred to as being axially oriented The second opening is radially oriented in the end of the channel 74 and permits the insertion of a suspension component therein. A pair of coaxial securement holes 76 are opposingly formed in the arms 78 of the mounting bracket 74.

As seen in the embodiment of FIG. 1, a post 80 of a suspension component 14 (herein the post 80 of a ball joint 32 attached to the upper control arm 30) is inserted into an adapter or pinch collar 82. The pinch collar 82 corresponds in exterior shape to the interior of the channel 74 and allows for some minor relative motion therebetween during assembly and adjustment. The adapter 82 is preferably formed from a compressed powdered metal because of the high strength which such alloys tend to exhibit. Other materials having similar strength characteristics can also be employed. The adapter 82 is secured in the channel 74, and subsequently to the post 80, by the insertion of a threaded fastener 86 or bolt through the securement holes 76 of the channel 74 and a transverse bore 88 extending through the body of the collar 82. For reasons further described below, a portion of the transverse bore 88 intersects with a portion of a radial bore 84 also extending through the collar 82.

To permit the insertion of the post 80 into the radial bore 84 of the collar 82, the collar 82 is provided with a radial slot 90 which, when pinched shut by the threaded fastener 86, decreases the diameter of the radial bore 84. The slot 90 is in communication with on side of the radial bore 84 and extends outwardly through the collar 82 toward the axial opening of the channel 74.

In assembling the control arm 30 to the steering knuckle assembly 16, the post 80 is inserted into the radial bore 84 of the collar 82. When properly inserted, a recessed portion 89 on the post 80 will align with the transverse bore 88 of the collar 82. The collar 82, along with the control arm 30, may then be inserted into the channel 74, aligning the transverse bore 88 with the securement holes 76. Next, the threaded fastener 86 is inserted through both the securement holes 76 and the transverse bore 88 while a nut 92 is attached and tightened to the end of the threaded fastener 86. The nut 92, fastener 86 and channel 44 will coact to exert a clamping force on the collar 82, pinching closed the slot 90 and retentively securing the post 80 therein.

To complete assembly, a lower control arm 26 may be secured to the knuckle housing 62 by a lower ball joint 28 using conventional means or even a second attachment means as defined by the present invention.

Figure 3:
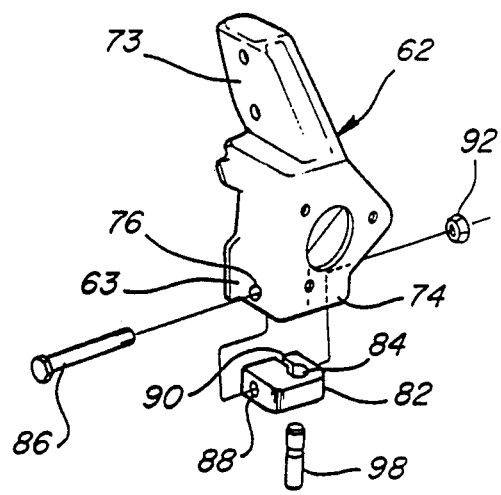
FIG. 3 is a partial perspective view of an embodiment of the present invention incorporated into a steering knuckle housing adapted for attachment of a suspension strut.

As seen in FIG. 3, a stamped knuckle housing 62 is illustrated as being adapted at its upper end 73 for attachment to a strut-type suspension component (not shown). However, in its lower end 63, the knuckle housing 62 incorporates an integrally formed channel 74 having a substantially rectangular shape. A pinch collar 82 is provided which has a shape corresponding to the particular knuckle housing 62. The knuckle housing 62 and collar 82 can thus be configured as required by the constraints and restrictions of the vehicle into which they are to be employed. As illustrated, a suspension component, such as a lower control arm, having a post 98 may be secured to the knuckle housing 62 in a manner embodying the principles previously described above.

Figure 2:
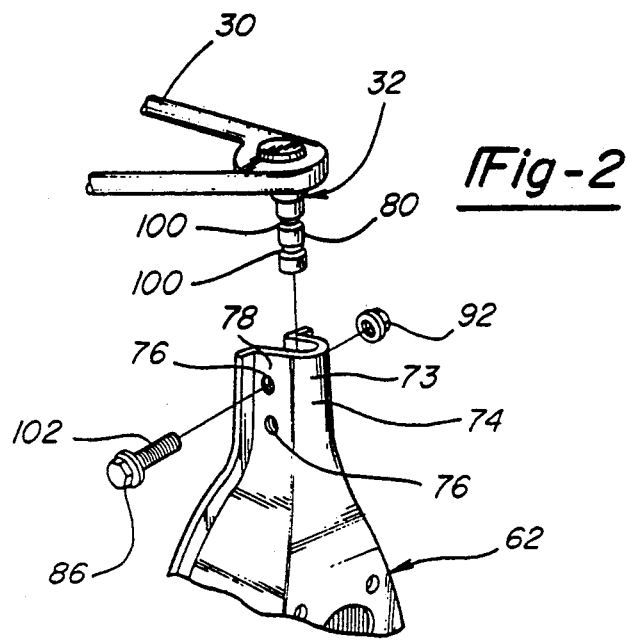
FIG. 2 is a partial perspective view of a second embodiment incorporating the principles of the present invention.
Figure 4:
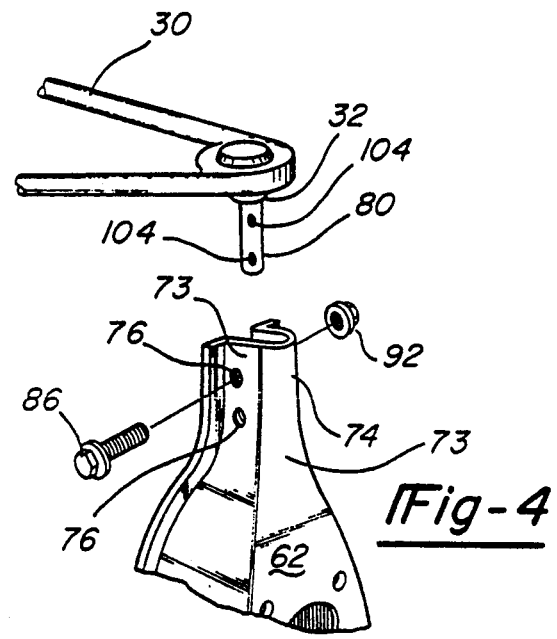
FIG. 4 is a partial perspective view of an additional embodiment incorporating the principles of the present invention.

FIGS. 2 and 4 illustrate additional embodiments of the present invention. However, neither embodiment requires the use of a pinch collar 82 in the channel 74. Both embodiments provide for two pairs of coaxially aligned securement holes 76 in the arms 78 of the channel 74, a post 80 for radial insertion into the channel 74 and transversely inserted threaded fasteners 86

In FIG. 2, the post 80 of a ball joint 32 in an upper control arm 30 is provided with a pair of recessed annular rings 100 which circumscribe the post 80. As with the previous embodiments, the post 80 is radially inserted into the channel 74 of the knuckle housing 62. Insertion of the post 80 continues until the upper control arm 30 is properly oriented and the recessed rings 100 are substantially aligned with both pair of opposing securement holes 76. Threaded fasteners 86 are then transversely inserted through the securement holes 76 and nuts 92 engaged therewith. Upon insertion, the shafts 102 of the fasteners 86 will engage the recessed rings 100. While only one fastener 86 is illustrated, two are to be employed. It may be found, however, that in some applications one fastener 86 would be sufficient.

The channel 74 is dimensioned so that the exteriormost surface of the post 80 will engage the interior surface of the channel 74 at the closed bend. The interference relationship between the fastener shafts 102 and the post recesses 100 coact with the dimensioning of the channel 74 to prevent an inadvertent release of the control arm 30 from the knuckle housing 62.

In the embodiment of FIG. 4, a pair of attachment bores 104 transversely extend through the post 80 of the upper ball joint 32. When the post 80 is inserted into the channel 74, the attachment bores 104 align with the securement holes 76 and two threaded fasteners 86 are inserted therethrough. The ends of the threaded fasteners 86 are then engaged with nuts 92 to securely retain the upper control arm 30 within the knuckle housing 62.

While the embodiments of FIGS. 2 and 4 are discussed as including a pair of securement holes 76, fasteners 86, and a pair of recesses 100 or attachment bores 104, the embodiments may be constructed where only one pair of coaxially aligned securement holes 76, one recess 100 or attachment bore 104, and one fastener 86 are employed to secure the control arm 30 to the knuckle housing 62. Furthermore, the attachment concept of the present invention could be used to secure a steering link 59 directly to a knuckle housing 62 having a mounting portion or channel therein for that specific purpose.

While the above description constitutes the preferred embodiments of the present invention, it will be appreciated that the invention is susceptible to modification, variation and change without departing from the proper scope and fair meaning of the accompanying claims.

I claim:

1. A steering knuckle attachment assembly adapted for mounting a steering knuckle to motor vehicle chassis components of the type including a projecting attachment post, the assembly comprising:

a stamped metal steering knuckle housing having an attachment area formed into a channel of predetermined shape, said channel having a closed side joining with two opposing walls extending therefrom and defining an open side, said channel also having an open end and said opposing walls defining at least one pair of substantially coaxial retaining openings therein;

a pinch collar having an external shape corresponding to said channel shape and being disposed within said channel, said collar including a first bore for receiving the post extending therethrough and being oriented generally parallel with said channel walls with a second bore extending through said pinch collar transversely to said first bore, said second bore being in substantial alignment with said housing retaining openings, said pinch collar having a slot extending from said first bore and passing through said second bore; and a retaining member for insertion through said knuckle coaxial retaining openings and said second bore of said collar, whereby said retaining member exerts a compressive force on said knuckle housing and said pinch collar to thereby mechanically couple said housing to said pinch collar and close said pinch collar slot and clamp said pinch collar onto the post thereby securing the post to said housing.

2. A steering knuckle assembly as set forth in claim 1 including at least one recessed portion formed in the post and circumscribing the post, said recessed portion aligning with said pinch collar second bore upon insertion of the post in said channel, said retaining member being in an interference engagement with said recessed portion upon insertion through said pinch collar second bore.

3. A steering knuckle assembly as set forth in claim 1 wherein said pinch collar is formed of compressed powdered metal.

4. A steering knuckle assembly as set forth in claim 1 wherein said metal knuckle housing is formed by deep draw stamped mild steel.

5. A steering knuckle assembly as set forth in claim 1 wherein said retaining member is positioned toward said open side of said channel relative to said pinch collar first bore thereby trapping the post within said channel.

* * * * *